G. P. PRESBY.
METHOD OF MAKING SHOES.
APPLICATION FILED APR. 28, 1915.
1,240,794.
Patented Sept. 18, 1917.
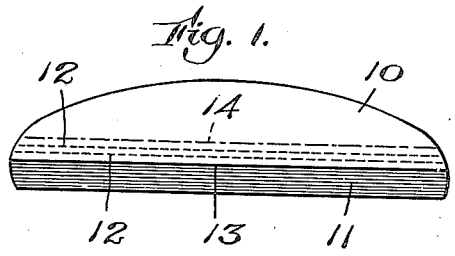
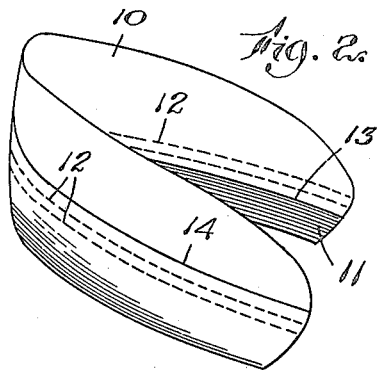
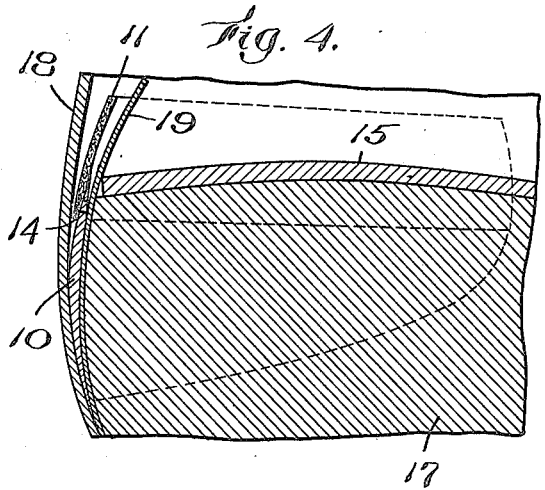
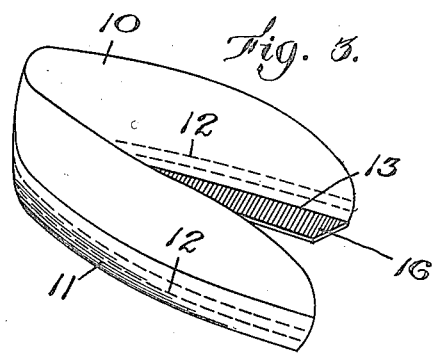
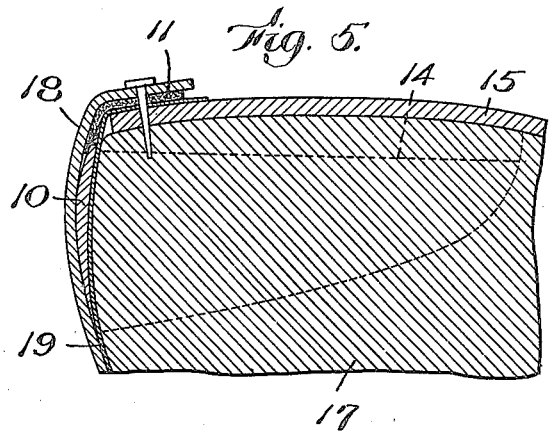
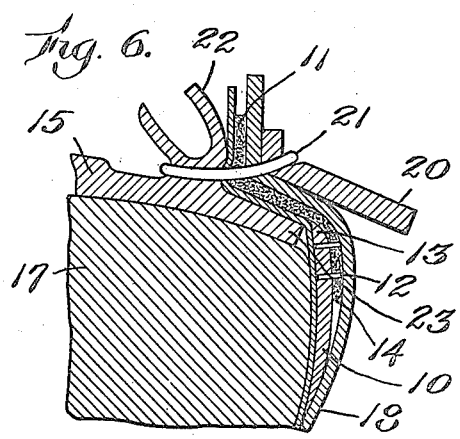
Inventor:
George P. Presby
by [signature]
Attorneys.

UNITED STATES PATENT OFFICE.

GEORGE P. PRESBY, OF WEST BRIDGEWATER, MASSACHUSETTS, ASSIGNOR TO BECKWITH BOX TOE COMPANY, OF DOVER, NEW HAMPSHIRE, A CORPORATION OF MAINE.

METHOD OF MAKING SHOES.

1,240,794. Specification of Letters Patent. Patented Sept. 18, 1917.

Original application filed February 5, 1915, Serial No. 6,255. Divided and this application filed April 28, 1915. Serial No. 24,446.

*To all whom it may concern:*

Be it known that I, GEORGE P. PRESBY, a citizen of the United States, and resident of West Bridgewater, in the county of Plymouth and State of Massachusetts, have invented certain new and useful Improvements in Methods of Making Shoes, of which the following is a specification.

This invention relates to a method of making shoes, and is a division of my copending application, 6,255, filed February 5, 1915, for improvement in counter stiffeners.

The counter stiffener illustrated and described in the said copending application is the basis of the method which forms the subject-matter of this application. One characteristic feature of the counter stiffener is that its heel-seat portion is capable of being rendered soft and pliable by a moderate degree of heat. It is composed of a suitable absorbent material and is impregnated with a suitable sizing or stiffening substance that becomes soft and plastic when heated.

My present improved method contemplates broadly the idea of using a counter stiffener having a heel-seat portion the forward extremities of which are sufficiently far forward to be caught and sewn by the inseam stitches; and it further contemplates the idea of making the said heel-seat portion of absorbent material, impregnating said absorbent material with sizing which may be readily softened, softening the said heel-seat portion preparatory to lasting, lasting the heel portion of the upper while said heel-seat portion is soft and limber, and forming the extremities of said heel-seat portion into the angle formed by the lip and feather or by the shoulder and feather of the insole while the said extremities are in a soft limber condition, to the end that the said extremities may be caused, while in a soft limber condition, to conform to the said angle and thereby permit the several elements which form the between substance to be compactly joined when the inseam is sewn. I have mentioned a sizing substance which is adapted to be rendered soft by a moderate degree of heat. Although this is the kind of sizing which at present I consider the most desirable, my present method, so far as it relates to forming the extremities of the heel-seat portion into the angle of the insole, contemplates broadly any kind of sizing that becomes soft and plastic when heated moderately or when treated with a solvent. So far as the principle of this method is concerned, it does not matter whether the entire counter stiffener is composed of absorbent material and impregnated with sizing, or whether only the heel-seat portion is so composed and impregnated.

For reasons which are not involved in the fundamental principle of the method as hereinbefore stated, I prefer to make the counter stiffener in two parts, and to use different materials for said parts, whereby the body or stiffening portion of the device may be made of a piece of relatively stiff material, such as leather, while the heel-seat portion may be made of relatively soft absorbent material and impregnated with any suitable sizing for the purpose hereinbefore mentioned. The two pieces thus used maybe joined by any suitable means, such as stitches. In either event, whether the article be made of two pieces as stated, or whether it be made of a single piece of absorbent material and impregnated with a sizing substance, the heel-seat portion would be softened when the laster is about to perform the lasting operation; and while the heel-seat portion is in a soft limber condition the shoe would be lasted, the heel-seat portion of the stiffener being turned inwardly with the other elements in the course of lasting the heel portion of the shoe. If the sizing is one which may be softened by a liquid solvent, it would in many cases remain in a soft limber condition for a sufficient length of time to include the lasting operation and the inseam-sewing operation. On the other hand, if the sizing substance is one which would be softened by heat, it would set before the inseam-sewing operation would be performed, but that would not matter provided the said extremities were held in their formed-in condition while the sizing set. If the sizing substance is one which would be softened by heat, it would preferably be a substance which would have a relatively low melting point in order to permit the desired softening by a moderate degree of heat without injuring the leather or the laster's hands.

Of the accompanying drawings, which illustrate the preferred form of counter stiffener and the manner in which such counter stiffener would be used in practising this invention:

Figure 1 represents an elevation of a counter-stiffener blank.

Fig. 2 represents a perspective view of an unmolded blank curved to permit assembling with the other elements of a shoe.

Fig. 3 represents a perspective view of a molded counter stiffener.

Fig. 4 represents a longitudinal section of the heel portion of a last together with the shoe elements which are assembled for lasting, an unmolded counter stiffener blank being included and arranged in position to be molded by the lasting operation.

Fig. 5 represents a view similar to Fig. 4 showing the shoe elements as having been lasted, and the counter stiffener as having been molded by such lasting operation.

Fig. 6 represents a cross section, on a larger scale, of a portion of a welted shoe on the last. The plane of this section is in the vicinity of the plane where the shank and heel portions meet, the forward portion of the counter-stiffening portion being shown caught by the inseam stitches.

The same reference characters indicate the same parts wherever they occur.

The counter stiffener comprises two members 10 and 11 which are lapped with relation to each other, the lapped portions being fastened together by stitches 12. I have shown two rows of such stitches, these rows being substantially parallel to the edges of the lapped portions. The lower edge of the member 10 is indicated at 13 and the upper edge of the member 11 is indicated at 14. In practice, the edge 13 will be arranged substantially contiguous to the edge of the insole 15 and the counter stiffener will preferably be arranged so that the lapped portion of 11 will be outside of the portion 10. The reason for this arrangement is that the adhesive stiffening substance with which the member 11 is impregnated, as hereinafter explained, penetrates absorbent bodies very readily and discolors them, and whenever it reaches the lining of the shoe it penetrates and discolors the latter. If the discoloration occurred at points which could be observed when the shoe is finished it would operate against the salability of the shoe. The lapped portion of the stiffening member 10, when arranged between the lining and the lapped portion of the member 11, prevents such discoloration of the lining at the points mentioned.

The member 10 is composed of any suitable stiff material, such as leather, and the member 11 is composed of a suitable absorbent material such as wool felt and is impregnated with suitable moisture-proof stiffening substance which at ordinary temperatures will be comparatively stiff though resilient, but which is capable of being rendered soft and plastic by a moderate degree of heat.

The stiffening substance which I have found to be satisfactory for the purpose is a hydrocarbon substance known as montan wax, but, in specifying the latter, I do not limit the scope of my invention to any one substance. Any other substance having the characteristics hereinbefore described would serve the purpose. Montan wax may be used alone, or it may be blended with a suitable relatively hard asphalt, which will melt at approximately 225° F. The two hydrocarbons above mentioned may be blended to form a compound which will melt at 200° F. and will become soft and pliable at substantially 160° F. and becomes tacky when soft. Such compound is adhesive and in this respect it reinforces the connection between the members 10 and 11, and stiffens the pulled-over portions of the lining and upper and causes said portions to stick to the pulled-over portion of the member 11.

A blank, such as that shown by Fig. 1, may be molded before being assembled with the other elements of a shoe, but, as a preliminary step to performing the molding operation, the blank, or at least the member 11, should be heated sufficiently to soften the stiffening substance. If the member 11 be heated to a temperature of approximately 180° F., the stiffening substance will be softened to such extent that the member 11 will be limber and may be molded with great facility to form a heel-seat flange as indicated at 16 in Fig. 3. If the stiffening substance be permitted to cool while the counter stiffener is in the form shown by Fig. 3, the heel-seat portion will retain such form but will not lose all resilience or flexibility.

I have found, however, that a separate molding operation is not necessary, for, if the unmolded blank be heated sufficiently to soften the member 11 and while so heated is assembled with the other elements of the shoe as shown by Fig. 4 and subjected to a lasting operation, the member 11 will conform to the shape of the other lasted elements as shown by Fig. 5.

A portion of a last is indicated at 17 and a shoe upper and lining are indicated respectively at 18 and 19. Assuming that the member 11 is heated and thereby rendered limber when assembled as shown by Fig. 4, and that the lasting operation is performed while the member 11 is limber, the member 11 will be molded by the lasting operation, will become stuck to the pulled-over portions of the upper and lining, and upon cooling will set in its molded condition.

One purpose in arranging the lapped marginal portion of the member 10 inside the lapped marginal portion of the member 11 is to keep the tougher material (leather) against the lining of the shoe where the wear occurs as between the wearer's foot and the counter stiffener. Another purpose is to keep the inner surface of the counter stiffener smooth. If the edge 14 of the member 11 were arranged upon the inner side of the member 10, it would come in contact with the lining and would wear away the lining more rapidly. There is still another reason for the arrangement in question. The connection between the members 10 and 11 depends upon the stitches 12. In consequence of arranging the lapped portion of the member 10 upon the inner side of the member 11, the member 11 is bent upon the edge 13 as shown by Figs. 5 and 6, said edge relieving the stitches of some of the stress to which they are subjected when the member 11 is drawn inwardly and when the shoe is expanded by the wearer's foot.

A very serious difficulty in the manufacture of boots and shoes has been in forming the inseam where the counter stiffener is caught by the inseam stitches. The material of which most counter stiffeners are made is so stiff that it would be impossible to draw, tuck, or otherwise form the counter stiffener snugly into the angle formed by the lip and feather or by the lip and shoulder, as the case may be, of the insole. If the material of the counter stiffener is too stiff, it will bridge across said angle and leave a cavity, causing the shoe to bulge at the sides of the shank portion and setting the inseam stitches so far out that when the outsole is stitched on, the outsole stitches are necessarily set out beyond the desired line. The outsole stitches are thus, in a great many cases, forced to lie on or beyond the line on which the outsole is to be trimmed, and, in any case, the shoe does not fit snugly against the shank portion of the foot. These difficulties are the inevitable result of the inability to form the ends of the counter stiffener compactly into the angle of the insole. I overcome these difficulties by using a counter stiffener such as that hereinbefore described and by proceeding with the lasting operation as follows.

I soften the sizing in the heel-seat portion 11 of the counter stiffener before lasting the shoe. This softening operation will be caused by heating or by applying a liquid solvent, according to the character of the sizing employed. I then last the shoe, preferably the heel portion first in accordance with the usual practice. The lasting operation causes the counter stiffener to conform to the shape of the heel portion of the last. Some lasting machines are provided with plates or wipers which are arranged and operated to press, tuck, or otherwise form the pulled-over material into the angle formed by the lip 22 and feather 23 of the insole. If such a machine is employed, the said plates or wipers may be left in position to hold the ends of the member 11 snugly in the said angle while the forepart of the shoe is being lasted. If the sizing in the member 11 is the kind which is softened by heating, it will set in the course of lasting the forepart of the shoe, so that the formed-in portions of the counter stiffener will have acquired the shape of the angle of the insole and will have stuck to the insole before the forming-in devices are removed. If the forming-in operation is performed otherwise than by plates or wipers of the character mentioned, the formed-in portions may be secured temporarily by driving tacks into the said angle and leaving said tacks until the sizing has set.

If the sizing is the kind which requires a liquid solvent, and if it is going to be permitted to set before the inseam is sewn, tacks may be driven into the said angle to hold the formed-in portions as hereinbefore stated. When a sizing which requires a liquid solvent is used, the inseam would, in some cases, be sewn before the sizing has set, and in such cases the formed-in portions of the member 11 would be drawn into the angle still more snugly by the tightening of the inseam stitches 21. The same effect could be produced in the case of a sizing which requires heat, by steaming the formed-in portions of the member 11 immediately prior to sewing the inseam.

The drawings show a "welt" shoe, the welt strip of which is indicated at 20. It will be understood, however, that the ability of the softened member 11 to conform to the angle of the insole applies to "turned" shoes as well as to "welt" shoes.

I claim:

1. In the art of shoe-making, the herein described method, which consists in softening the sizing of a sized heel-seat portion of a counter stiffener of an unsewed shoe, forming the end portions of said heel-seat portion into the angle between the feather and lip, of the insole while said sizing in them is soft, and holding said formed-in portions in said angle while said sizing in them sets.

2. In the art of shoe-making, the herein described method, which consists in softening the sizing of a sized heel-seat portion of a counter stiffener of an unlasted shoe, lasting the shoe and wiping the end portions of said heel-seat portion into the angle between the feather and lip of the insole while said sizing in them is soft, and holding said portions in said angle while said sizing in them sets.

3. In the art of shoe-making, the herein described method, which consists in lasting the shoe with a counter stiffener whose heel-seat portion is composed of limp absorbent material and impregnated with a heated adhesive pliable substance which hardens at ordinary atmospheric temperatures, forming the end portions of said heel-seat portion into the angle between the feather and lip of the insole while such adhesive substance in said end portions is heated and pliable, forming the upper into the angle formed by such formed-in end portions, holding the upper against such formed-in end portions while said adhesive substance in the latter sets, and sewing such contiguous formed-in portions of the upper and said heel-seat member to the insole.

In testimony whereof I have affixed my signature.

GEORGE P. PRESBY.